US012368257B2

(12) United States Patent
Sugimoto

(10) Patent No.: US 12,368,257 B2
(45) Date of Patent: Jul. 22, 2025

(54) TERMINAL FITTING AND CONNECTOR WITH DEFORMATION-SUPPRESSIBLE ELASTIC CONTACT PORTION

(71) Applicant: SUMITOMO WIRING SYSTEMS, LTD., Mie (JP)

(72) Inventor: Yuki Sugimoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 401 days.

(21) Appl. No.: 17/965,180

(22) Filed: Oct. 13, 2022

(65) Prior Publication Data

US 2023/0130951 A1 Apr. 27, 2023

(30) Foreign Application Priority Data

Oct. 25, 2021 (JP) ................................ 2021-173893

(51) Int. Cl.
*H01R 13/11* (2006.01)
*H01R 13/424* (2006.01)

(52) U.S. Cl.
CPC ........... *H01R 13/11* (2013.01); *H01R 13/424* (2013.01)

(58) Field of Classification Search
CPC ...... H01R 13/11; H01R 13/424; H01R 13/05; H01R 13/08; H01R 13/15; H01R 13/187; H01R 13/40
See application file for complete search history.

(56) References Cited

U.S. PATENT DOCUMENTS

| | | | | |
|---|---|---|---|---|
| 5,733,155 A * | 3/1998 | Sagawa | H01R 13/113 | 439/852 |
| 6,116,970 A * | 9/2000 | Yamamoto | H01R 13/113 | 439/852 |
| 6,428,365 B1 * | 8/2002 | Yamamoto | H01R 13/113 | 439/852 |
| 6,478,636 B1 * | 11/2002 | Makita | H01R 13/113 | 439/852 |
| 6,527,601 B2 * | 3/2003 | Chen | H01R 13/187 | 439/852 |
| 6,544,080 B1 * | 4/2003 | Yamamoto | H01R 13/113 | 439/852 |
| 6,736,684 B2 * | 5/2004 | Ishiyama | H01R 13/187 | 439/852 |
| 9,660,393 B2 * | 5/2017 | Shinmi | H01R 13/7032 | |
| 11,239,595 B2 * | 2/2022 | Sugimoto | H01R 13/73 | |
| 12,057,652 B2 * | 8/2024 | Sugimoto | H01R 13/40 | |

FOREIGN PATENT DOCUMENTS

JP 2014-082158 A 5/2014

* cited by examiner

*Primary Examiner* — Harshad C Patel
(74) *Attorney, Agent, or Firm* — Venjuris, P.C.

(57) ABSTRACT

A terminal fitting 13 includes a tubular portion 30, an elastic contact portion 33, and an extended portion 35. The tubular portion 30 extends in a front-rear direction and has an open front surface. The elastic contact portion 33 is disposed in the tubular portion 30, extends in a front-rear direction, and has a rear end directly or indirectly connected to the tubular portion 30 and a front end that is a free end. The extended portion 35 extends from the tubular portion 30 and opposes the elastic contact portion 33 in a direction in which the elastic contact portion 33 bends. The extended portion 35 is disposed at a position exposed on a front surface side of the tubular portion 30.

7 Claims, 9 Drawing Sheets

TERMINAL FITTING AND CONNECTOR WITH DEFORMATION-SUPPRESSIBLE ELASTIC CONTACT PORTION

CROSS-REFERENCE TO RELATED APPLICATIONS

This application is based on and claims priority from Japanese Patent Application No. 2021-173893, filed on Oct. 25, 2021, with the Japan Patent Office, the disclosure of which is incorporated herein in its entirety by reference.

TECHNICAL FIELD

The present disclosure relates to a terminal fitting and a connector.

BACKGROUND

Japanese Patent Laid-open Publication No. 2014-082158 discloses a terminal fitting. This terminal fitting is a female terminal and has a quadrangular tubular connection portion. The connection portion houses an elastic contact piece that is folded back obliquely upward from the front edge of a bottom plate of the connection portion. This elastic contact piece is formed by three contact pieces arranged side by side in the left-right direction. When the female terminal is connected to a male terminal, each of the three contact pieces come into contact with a wide tab of the male terminal and the rear end side of the contact pieces are deformed so as to bend downward. An excessive bending prevention piece suppresses excessive downward bending of the left and right contact pieces of the three contact pieces.

SUMMARY

However, the central contact piece is not provided with a structure for preventing excessive downward bending. For this reason, there is a concern that the central contact piece may excessively bend due to contact with the tab, a foreign object, or the like, and may not return to its original shape due to plastic deformation. Even if the terminal fitting of Japanese Patent Laid-open Publication No. 2014-082158 can be provided with a structure for preventing excessive bending of the central contact piece, the following problem remains. Specifically, there is a concern that, after inserting the terminal fitting into the housing, when the front end of the contact piece exposed forward of the housing is brought into contact with a probe pin in order to confirm conductivity, the central contact piece may plastically deform and not return to its original shape.

In view of this, the present disclosure provides a technique with which it is possible to suppress plastic deformation of an elastic contact portion of a terminal fitting due to an external force.

A terminal fitting according to the present disclosure includes a tubular portion that extends in a front-rear direction and has an open front surface, an elastic contact portion that is disposed in the tubular portion, extends in a front-rear direction, and has a rear end directly or indirectly connected to the tubular portion and a front end that is a free end, and an extended portion that extends from the tubular portion and opposes the elastic contact portion in a direction in which the elastic contact portion bends, and the extended portion is disposed at a position exposed on a front surface side of the tubular portion.

According to the present disclosure, plastic deformation of an elastic contact portion of a terminal fitting due to an external force can be prevented.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
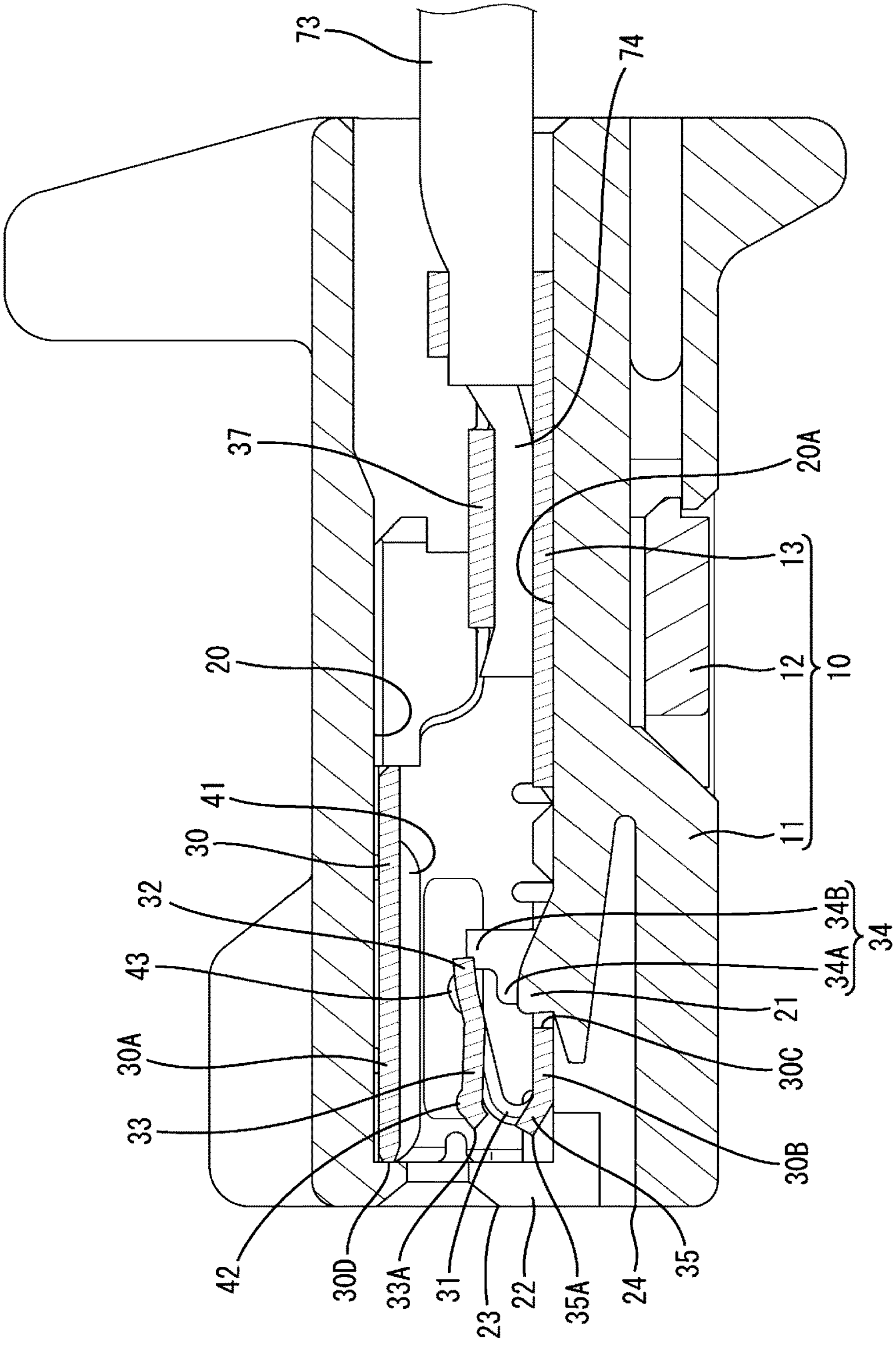
FIG. 1 is a side cross sectional view of a connector according to a first embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure will be listed and described.

(1) A connector according to the present disclosure is a terminal fitting including a tubular portion that extends in a front-rear direction and has an open front surface, an elastic contact portion that is disposed in the tubular portion, extends in a front-rear direction, and has a rear end directly or indirectly connected to the tubular portion and a front end that is a free end, and an extended portion that extends from the tubular portion and opposes the elastic contact portion in a direction in which the elastic contact portion bends, and the extended portion is disposed at a position exposed on a front surface side of the tubular portion.

With this configuration, due to provision of the extended portion, excessive bending of the elastic contact portion can be suppressed. Further, since the front end of the elastic contact portion is a free end, the extended portion that suppresses bending deformation of the elastic contact portion can be exposed on the front surface side of the tubular portion. For this reason, conductivity can be confirmed by bringing the extended portion instead of the elastic contact portion into contact with a probe pin, and as a result, the elastic contact portion is not likely to be subjected to an external force, and even if the elastic contact portion is subjected to an external force, plastic deformation thereof can be suppressed.

(2) It is preferable that a front end of the extended portion is disposed forward of a front end of the elastic contact portion in a natural state.

With this configuration, a probe pin can easily be brought into contact with the extended portion without coming into contact with the elastic contact portion, and as a result, a situation where the elastic contact portion of the terminal fitting is pressed by the probe pin and plastically deformed can be more reliably suppressed. Note that the "natural state" means a state where the elastic piece does not bend or is deformed.

(3) It is preferable that the front end of the extended portion is disposed rearward of a front end of the tubular portion.

When the extended portion plastically deforms due to coming into contact with a foreign object or the like, the function of suppressing excessive bending of the elastic contact portion may be impaired. In view of this, with this configuration, the tubular portion can function as a protection wall and suppress a situation where the extended portion comes into contact with a foreign object, and thus the above problem can be suppressed.

(4) It is preferable that the extended portion extends obliquely forward from a portion of the tubular portion in a circumferential direction.

In a configuration in which the extended portion extends perpendicular to the tubular portion, since the entire force applied by the probe pin that comes into contact with the extended portion from the front is received by the extended portion, the extended portion is likely to plastically deform. In this regard, with this configuration, the force applied by the probe pin that comes into contact with the extended portion from the front can be distributed to the tubular portion as well, and thus plastic deformation of the extended portion can be suppressed. Accordingly, a situation where the function of suppressing excessive bending of the elastic contact portion may be impaired due to plastic deformation of the extended portion can be suppressed.

(5) A connector may include the terminal fitting and a housing. A housing may include a cavity in which the terminal fitting is disposed, a lance capable of bending and deforming, and that is disposed in the cavity and locks the terminal fitting, a front wall portion disposed forward of the cavity, and a molding hole that is open in the front surface of the front wall portion forward of the lance. The extended portion of the terminal fitting may be disposed at a position that is visible from the front side of the housing via the molding hole.

With this configuration, the extended portion of the terminal fitting can be exposed forward of the housing using the molding hole provided to form the lance. For this reason, compared to a configuration in which a hole for exposing the extended portion is separately provided, the structure of the housing can be simplified.

Detail of Embodiment of Present Disclosure

Specific examples of the present disclosure will be described below with reference to the drawings. Note that the present invention is not limited to these examples, but defined by the claims, and intended to include all modifications within the meaning and the scope equivalent thereof.

First Embodiment

FIG. 1 shows a connector 10 of a first embodiment. The connector 10 is fitted to a partner connector (not shown). In the following description, the direction in which the connector 10 is fitted to the partner connector is forward of the connector 10, and the opposite direction thereto is rearward of the connector 10. The up-down direction shown in FIG. 1 and FIGS. 5 to 9 is the up-down direction of the connector 10. The left-right direction when the connector 10 is viewed from the front is the left-right direction of the connector 10.

As shown in FIG. 1, the connector 10 is provided with a housing 11, a retainer 12, and a terminal fitting 13.

Housing 11

The housing 11 is made of a synthetic resin. As shown in FIG. 1, the housing 11 includes a cavity 20, a lance 21, a front wall portion 22, an insertion hole 23, and a molding hole 24.

As shown in FIG. 1, the cavity 20 extends in the front-rear direction, and is open on the rear side of the housing 11. The terminal fitting 13 is inserted into the cavity 20 from the rear side.

As shown in FIG. 1, the lance 21 extends obliquely forward from an inner wall (specifically, a bottom wall 20A) of the cavity 20 in the manner of a cantilever, and can bend and deform in the up-down direction. The lance 21 locks the terminal fitting 13 disposed in the cavity 20 and prevents the terminal fitting 13 from coming out rearward.

As shown in FIG. 1, the front wall portion 22 is disposed forward of the cavity 20.

Figure 7:
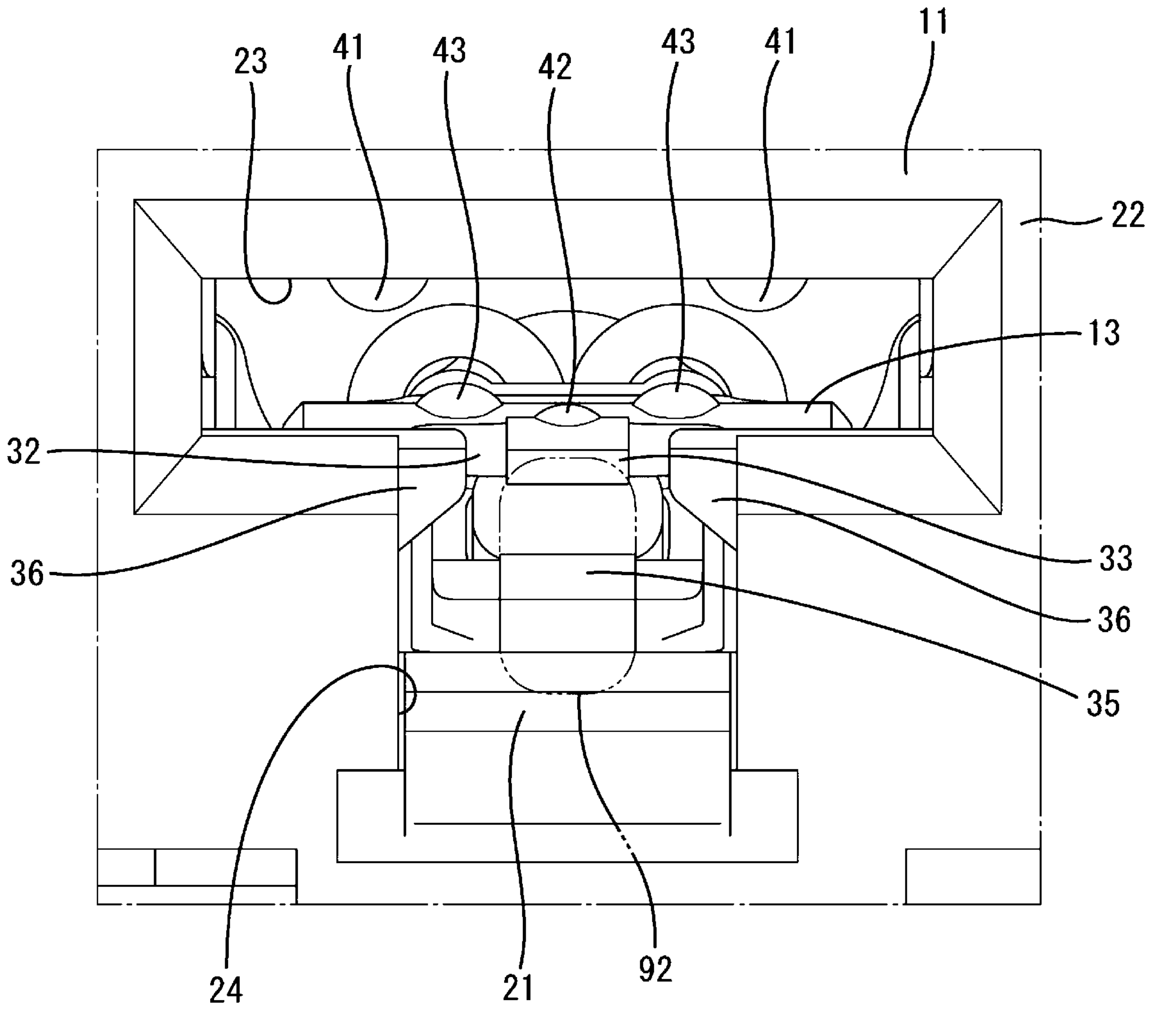
FIG. 7 is a front view of the vicinity of an insertion hole and a molding hole of the connector.

As shown in FIGS. 1 and 7, the insertion hole 23 extends through the front wall portion 22 in the front-rear direction. The insertion hole 23 is elongated in the left-right direction as viewed from the front. A partner terminal fitting 90 (see FIG. 9) is inserted into the insertion hole 23. The partner terminal fitting 90 is electrically connected to the terminal fitting 13 disposed in the cavity 20.

As shown in FIGS. 1 and 7, the molding hole 24 is open in the front surface of the front wall portion 22. The molding hole 24 is a hole formed when cutting out a shape for molding the lance 21. The molding hole 24 is disposed forward of the lance 21. The molding hole 24 is continuous with the insertion hole 23 and extends downward from the center of the insertion hole 23 in the left-right direction. The width dimension of the molding hole 24 in the left-right direction is smaller than the width dimension of the insertion hole 23 in the left-right direction.

Retainer 12

The retainer 12 is made of a synthetic resin. The retainer 12 is locked to the housing 11 and prevents the terminal fitting 13 disposed in the cavity 20 from coming out rearward.

Terminal Fitting 13

The terminal fitting 13 is conductive. The terminal fitting 13 is formed by bending a metal plate. As shown in FIGS. 2 to 5, the terminal fitting 13 includes a tubular portion 30, leg portions 31, a linking portion 32, an elastic contact portion 33, protruding portions 34, an extended portion 35, front plate portions 36, and a wire connection portion 37.

Figure 2:
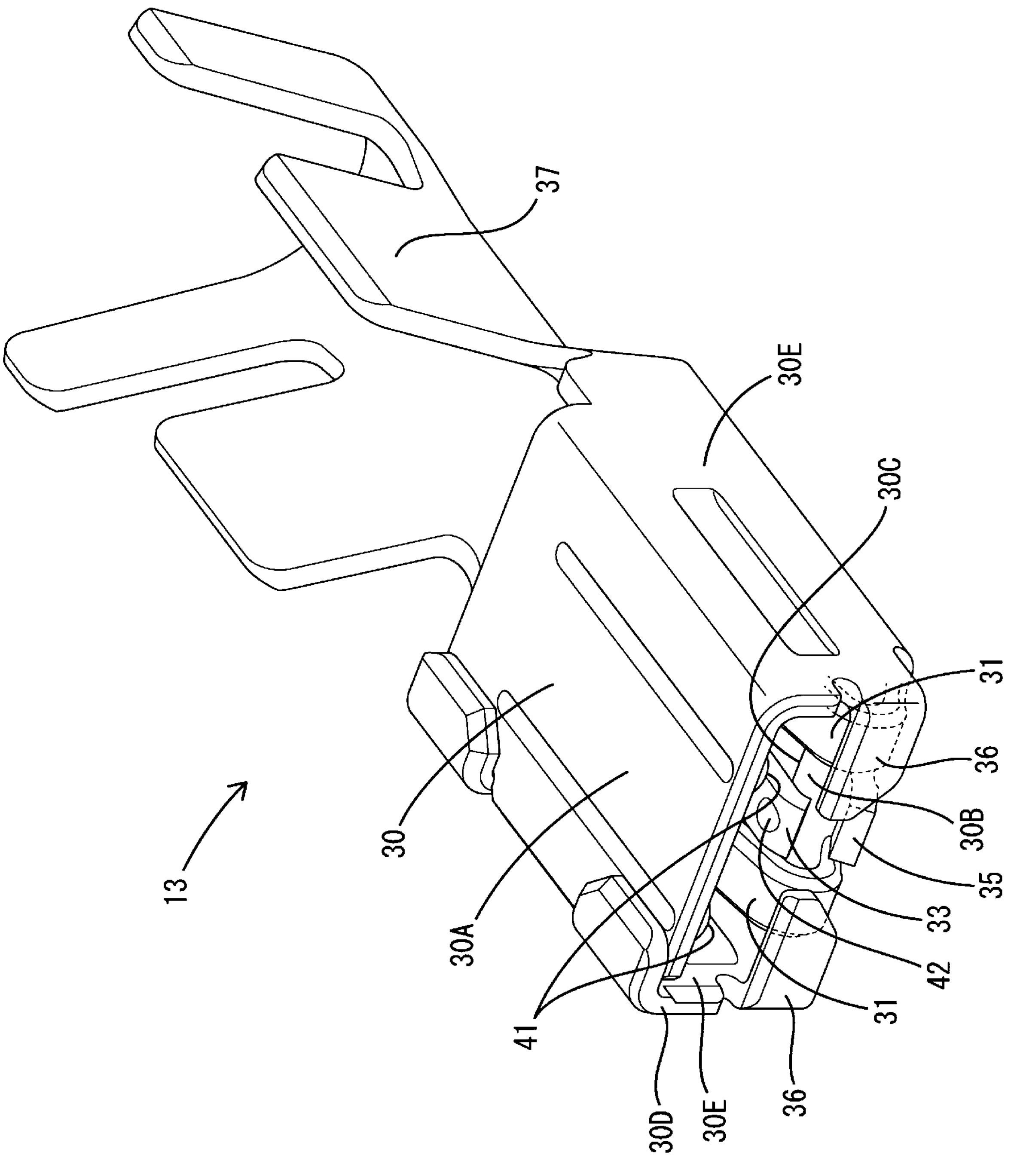
FIG. 2 is a perspective view of a terminal fitting.
Figure 3:
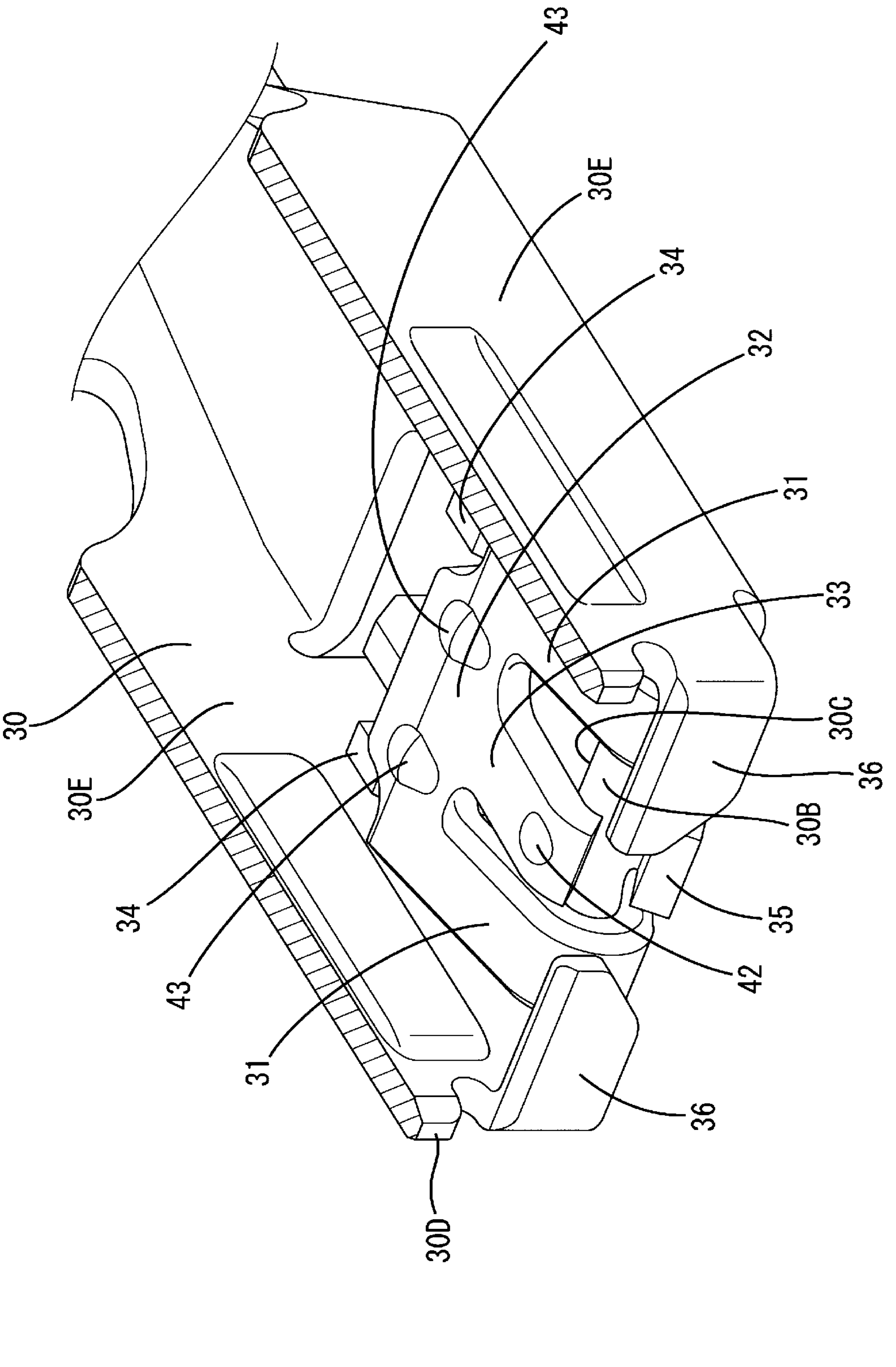
FIG. 3 is a perspective view of a lower half of the terminal fitting.
Figure 4:
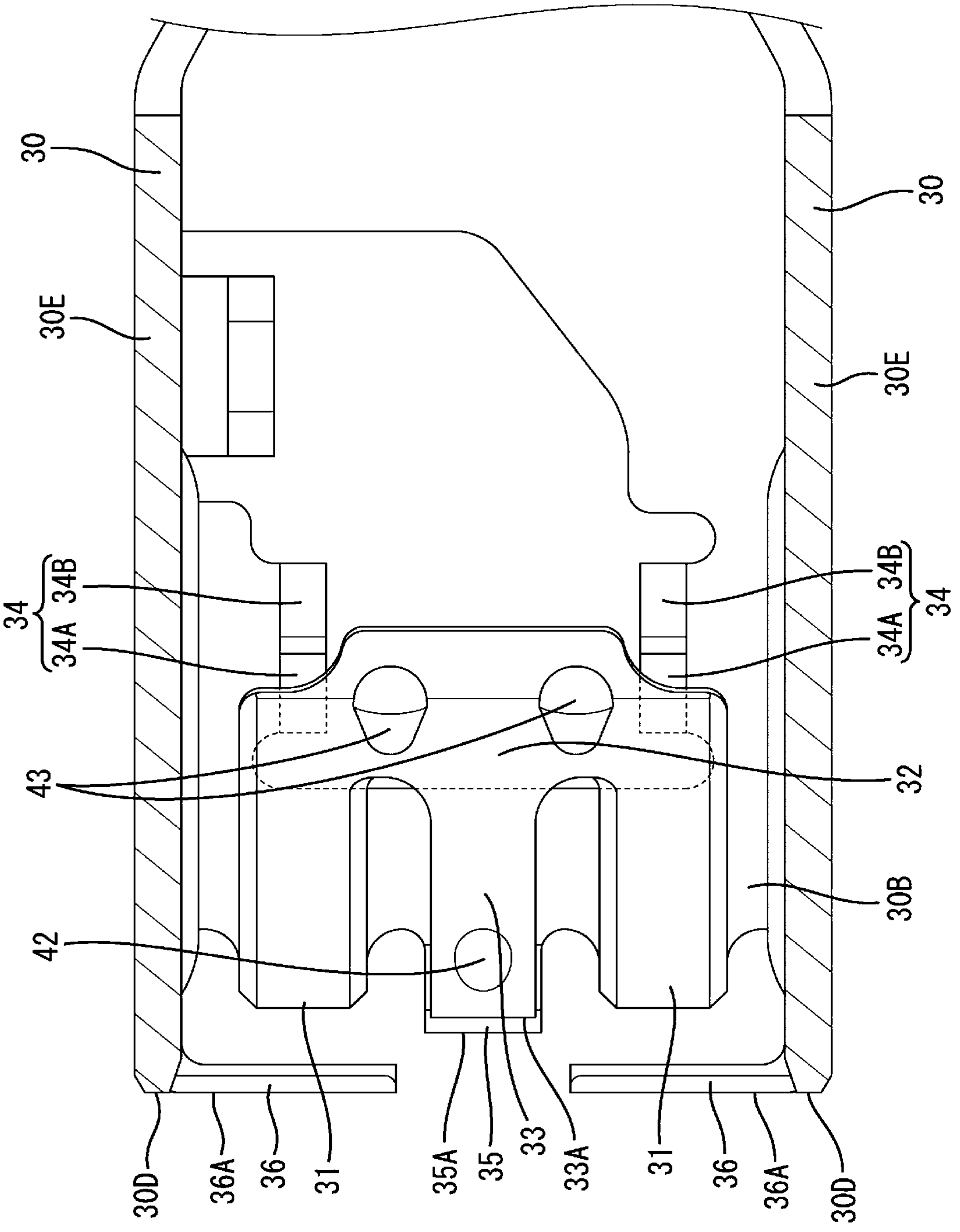
FIG. 4 is a plan view of the lower half of the terminal fitting.

As shown in FIGS. 2 and 3, the tubular portion 30 is formed in a tubular shape (more specifically, angular tubular shape) extending in the front-rear direction and the front and rear surfaces thereof are open. The tubular portion 30 is elongated in the left-right direction as viewed from the front.

Figure 8:
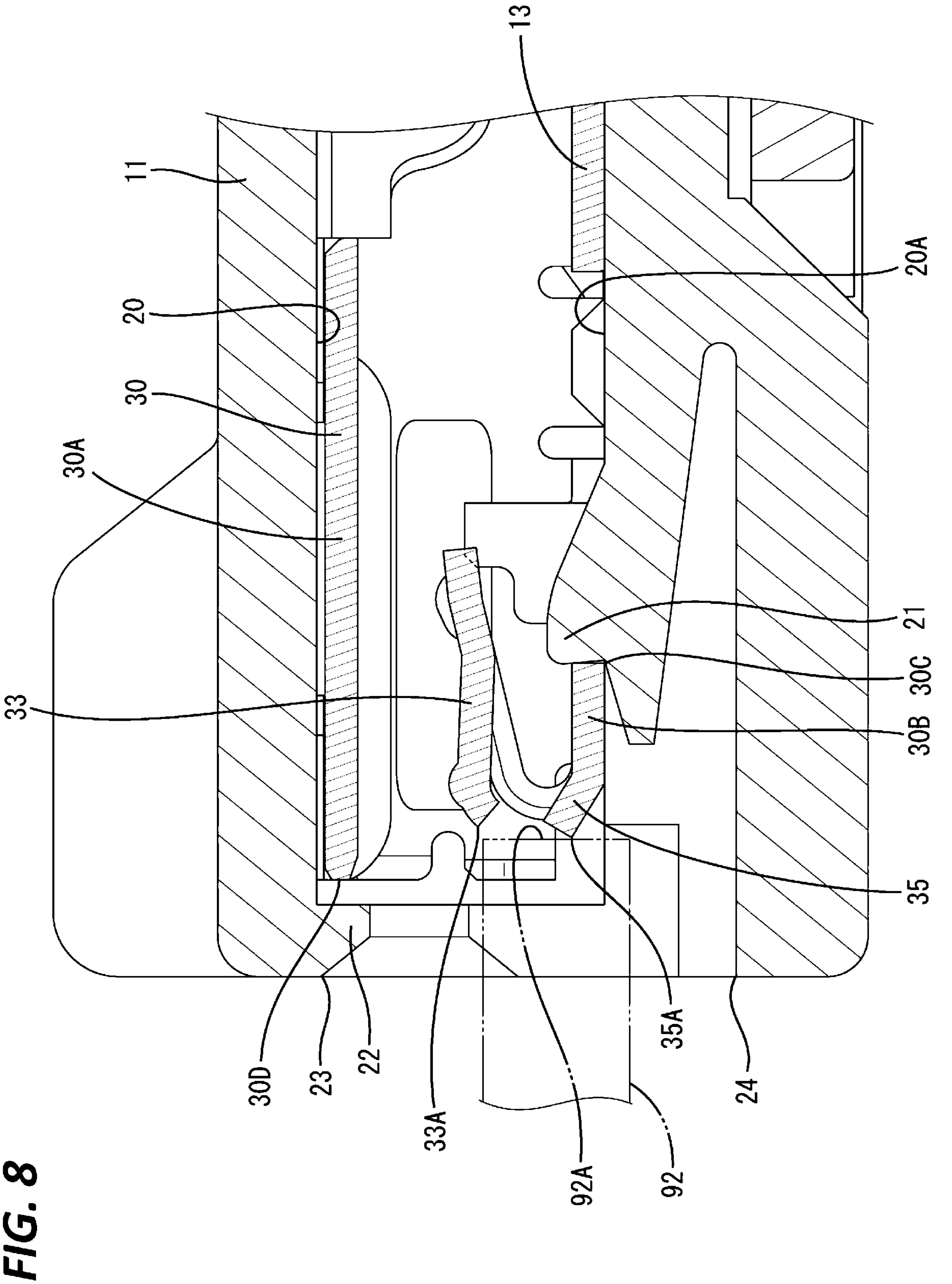
FIG. 8 is a side cross sectional view of the connector showing a state where the extended portion is brought into contact with a probe pin.

The tubular portion 30 includes an upper plate portion 30A and a lower plate portion 30B that oppose each other. The front end of the lower plate portion 30B is disposed rearward of the front end of the upper plate portion 30A. The lower plate portion 30B includes a locking hole 30C. The locking hole 30C extends through the lower plate portion 30B. As shown in FIG. 8, the lance 21 is locked to the circumferential edge portion of the locking hole 30C.

As shown in FIG. 3, the leg portions 31 extend from the front end of the lower plate portion 30B of the tubular portion 30, and are folded back inward of the tubular portion 30 and extend obliquely rearward. A pair of the leg portions 31 are provided spaced apart from each other in the left-right direction. The linking portion 32 links the rear end portions of the pair of leg portions 31. The elastic contact portion 33 is disposed between the pair of leg portions 31 and protrudes forward from the linking portion 32. That is, the elastic contact portion 33 extends in the front-rear direction, the rear end thereof being linked to the front end of the linking portion 32, and the front end 33A thereof being a free end. The leg portions 31 bend and deform in the up-down direction with a portion linked to the tubular portion 30 serving as a fulcrum. The elastic contact portion 33 bends and deforms in the up-down direction with the rear end thereof serving as a fulcrum.

Figure 5:
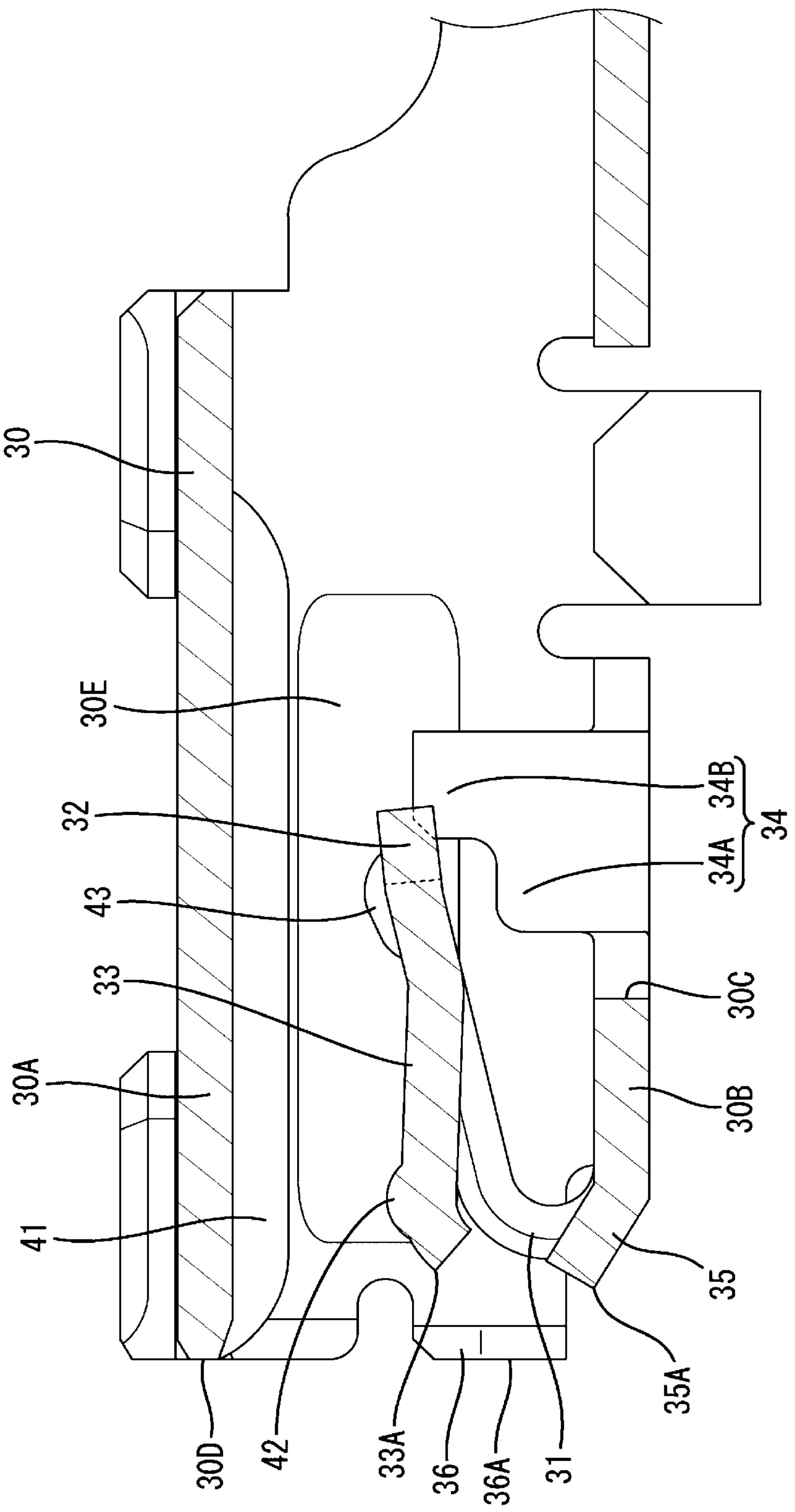
FIG. 5 is a side cross sectional view of the terminal fitting.
Figure 9:
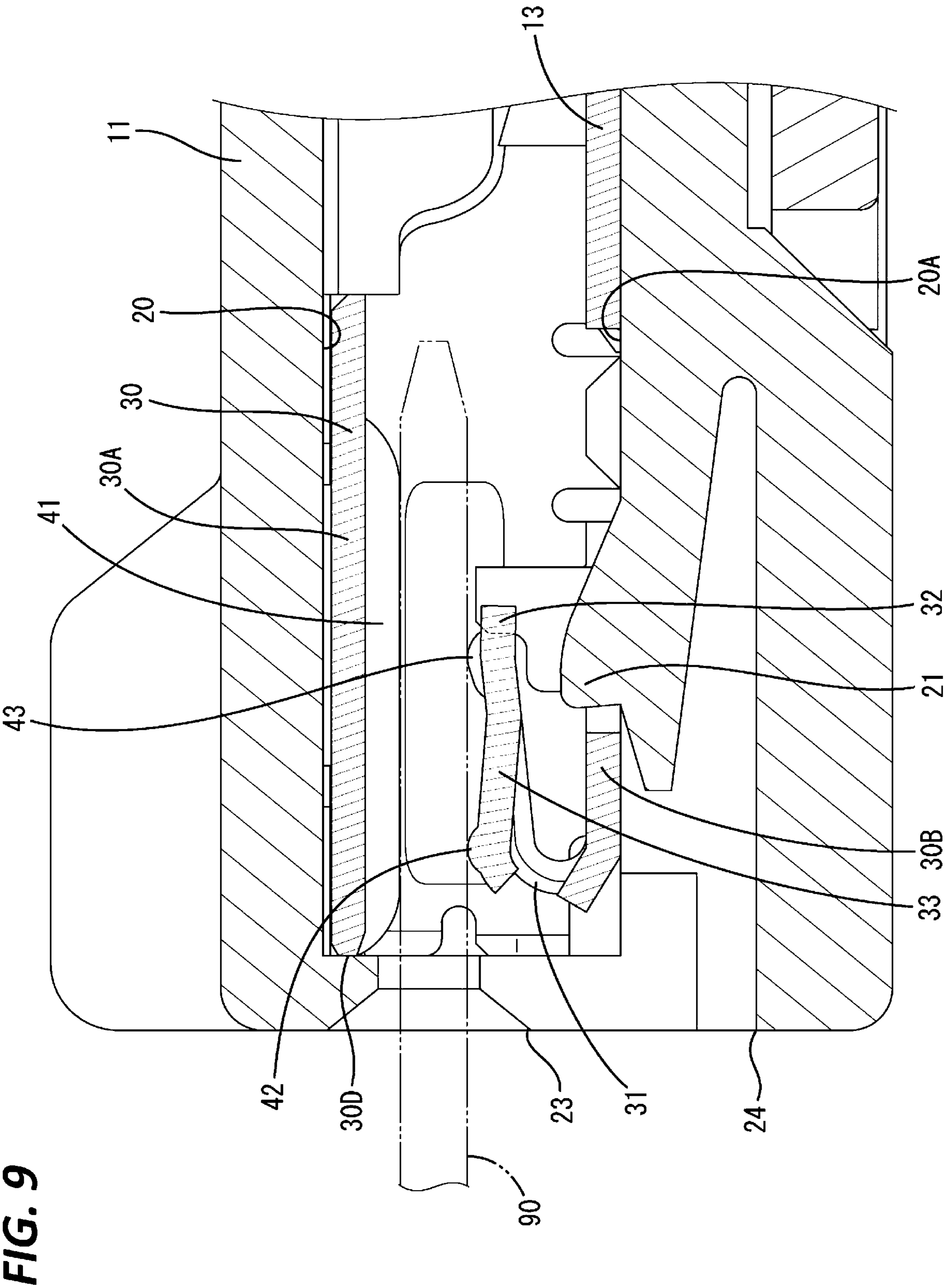
FIG. 9 is a side cross sectional view of the connector showing a state where the terminal fitting is connected to a partner terminal fitting.

As shown in FIGS. 5, 7, and 9, the terminal fitting 13 includes first contact portions 41, a second contact portion 42, and third contact portions 43. The first contact portions 41 are provided on the lower surface of the upper plate portion 30A of the tubular portion 30. A pair of the first contact portions 41 are provided spaced apart from each other in the left-right direction. The first contact portions 41 extend in the front-rear direction. The first contact portions 41 curve so as to protrude downward.

As shown in FIGS. 5, 7, and 9, the second contact portion 42 is provided on the upper surface of the elastic contact portion 33. The second contact portion 42 is configured as a contact point. The second contact portion 42 curves so as to protrude upward. The second contact portion 42 is located between the pair of the first contact portions 41 as viewed in the up-down direction. The second contact portion 42 is located between the front and rear ends of the first contact portions 41 in the front-rear direction.

As shown in FIGS. 5, 7, and 9, the third contact portions 43 are provided on the upper surface of the linking portion 32. The third contact portions 43 are configured as contact points. The third contact portions 43 curve so as to protrude upward. A pair of the third contact portions 43 are provided spaced apart from each other in the left-right direction. The third contact portions 43 are positioned between the left end of the first contact portion 41 on the left side and the right end of the first contact portion 41 on the right side in the left-right direction. The third contact portions 43 are positioned between the front and rear ends of the first contact portions 41 in the front-rear direction. The third contact portions 43 are located rearward of the second contact portion 42. The second contact portion 42 is located between the pair of the third contact portions 43 in the left-right direction.

As shown in FIG. 9, the partner terminal fitting 90 is inserted with the leg portions 31 and the elastic contact portion 33 bent downward, and sandwiched between the first contact portions 41, the second contact portion 42, and the third contact portions 43. In this manner, the terminal fitting 13 is electrically connected to the partner terminal fitting 90.

As shown in FIG. 5, the protruding portions 34 extend upward from the upper surface of the lower plate portion 30B of the tubular portion 30. The protruding portions 34 each include a first regulating portion 34A and a second regulating portion 34B. The first regulating portions 34A are disposed below the rear end portions of the leg portions 31 and oppose the rear end portions of the leg portions 31 in the up-down direction. The first regulating portions 34A suppress excessive downward bending of the rear end portions of the leg portions 31. The second regulating portions 34B are disposed rearward of the rear end portions of the leg portions 31, and disposed below the partner terminal fitting 90 connected to the elastic contact portion 33. The second regulating portions 34B suppress downward displacement and rotational movement of the partner terminal fitting 90. Note that "excessive bending" in the present specification means bending to an extent that exceeds the amount of bending of the elastic contact portion 33 when the terminal fitting 13 is normally connected to the partner terminal fitting 90.

Figure 6:
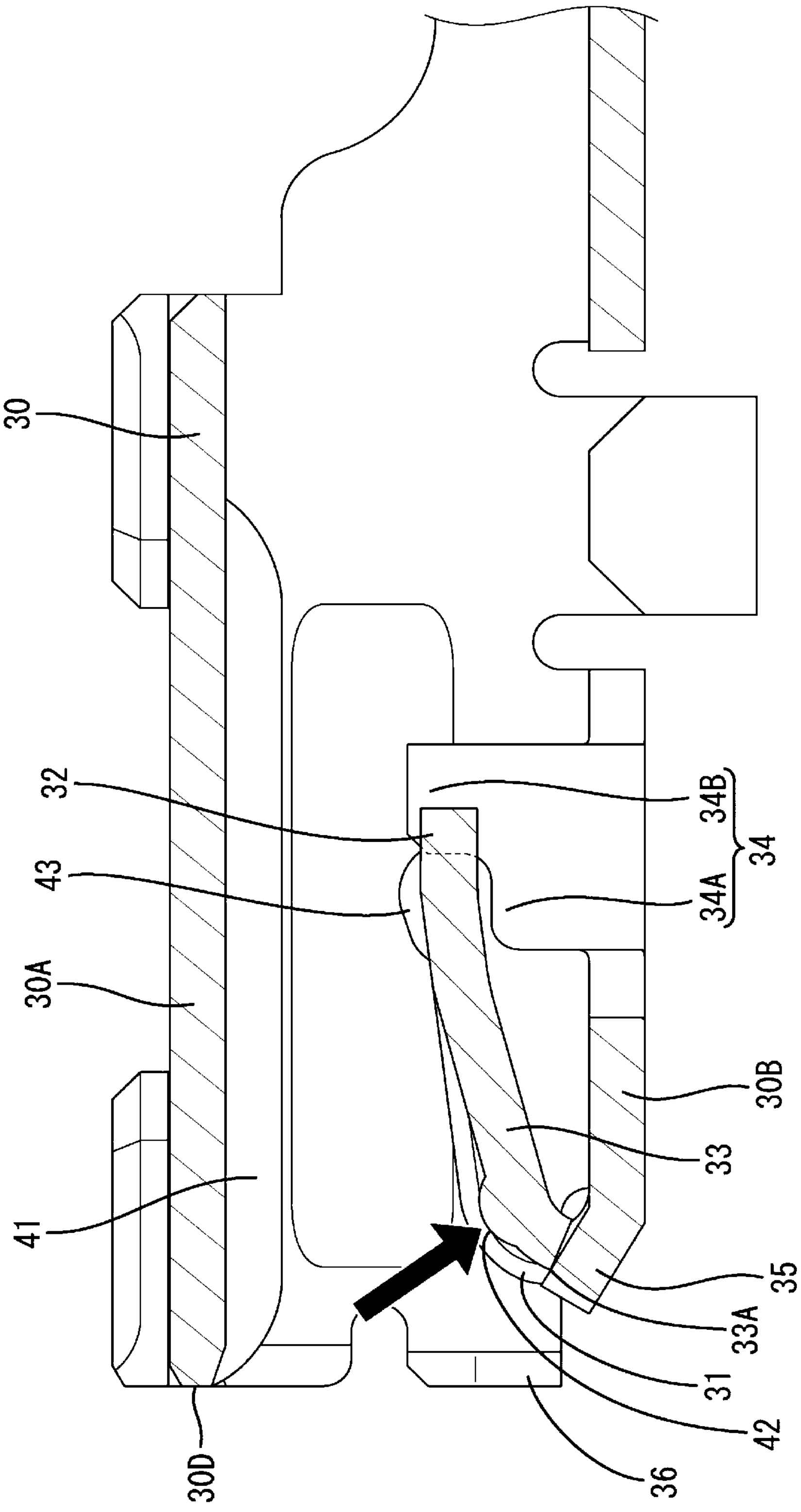
FIG. 6 is a side cross sectional view of the terminal fitting showing a state where an elastic contact portion is subjected to an external force and comes into contact with an extended portion.

As shown in FIG. 5, the extended portion 35 extends obliquely forward from the front end of the lower plate portion 30B of the tubular portion 30. The front end of the upper plate portion 30A described above and the front ends of left and right plate portions 30E constitute a front end 30D of the tubular portion 30, and the front end of the lower plate portion 30B is disposed rearward of the front end 30D of the tubular portion 30. The front end of the extended portion 35 is disposed rearward of the front end 30D of the tubular portion 30. The extended portion 35 is disposed between the pair of the leg portions 31 in the left-right direction. The extended portion 35 is disposed below the front end portion of the elastic contact portion 33, and opposes the elastic contact portion 33 in the up-down direction. As shown in FIG. 6, for example, when an external force that acts in the direction indicated by the arrow is applied to the elastic contact portion 33 due to a foreign object or the like, the extended portion 35 comes into contact with the leading end of the elastic contact portion 33 that is being pressed downward, and suppresses excessive bending of the elastic contact portion 33. The front end 35A of the extended portion 35 is disposed forward of the front end 33A of the elastic contact portion 33.

As shown in FIG. 2, the front plate portions 36 respectively extend inward in the left and right directions from and perpendicular to the front ends of the left and right plate portions 30E of the tubular portion 30. The front plate portions 36 are disposed below the upper plate portion 30A and a hole for inserting the partner terminal fitting 90 is formed between the front plate portions 36 and the upper plate portion 30A. The front ends 36A of the front plate portions 36, the front end of the upper plate portion 30A, and the front ends of the left and right plate portions 30E are aligned in the front-rear direction. As shown in FIG. 7, the upper ends of the front plate portions 36 are disposed below the upper end of the second contact portion 42 and the upper ends of the third contact portions 43. The extended portion 35 and the second contact portion 42 are disposed exposed between the left and right pair of front plate portions 36 as viewed from the front.

As shown in FIG. 1, the wire connection portion 37 is disposed on the rear side of the tubular portion 30. The wire connection portion 37 is electrically connected to a conductor 74 of the wire 73 through crimping or the like.

Operation and Effects of Connector 10

As shown in FIG. 1, the terminal fitting 13 is disposed in the cavity 20 of the housing 11. When disposed at the proper insertion position in the cavity 20, the terminal fitting 13 is inhibited from moving forward by the front wall portion 22, and inhibited from moving rearward by the lance 21 and the retainer 12. In a state where the terminal fitting 13 is disposed in the cavity 20, as shown in FIG. 7, the elastic contact portion 33 is exposed forward of the housing 11 via the insertion hole 23 and the molding hole 24, and the extended portion 35 is exposed forward of the housing 11 via the molding hole 24.

After the terminal fitting 13 is disposed in the cavity 20, as shown in FIG. 8, the terminal fitting 13 is brought into contact with a probe pin 92 from the front. A leading end surface 92A of the probe pin 92 is a flat surface extending in a direction along a plane perpendicular to the front-rear direction. The probe pin 92 is inserted into the insertion hole 23 and the molding hole 24 of the housing 11, and comes into contact with the front end 35A of the extended portion 35 of the terminal fitting 13. Upon confirming the conductivity between the probe pin 92 and the terminal fitting 13, it is determined that the terminal fitting 13 is disposed at the proper insertion position. Note that, if the terminal fitting 13 is not disposed at the proper insertion position, the probe pin 92 does not come into contact with the terminal fitting 13, and thus the conductivity is not confirmed. And thus, it is determined that the terminal fitting 13 is not disposed at the proper insertion position. The state where the terminal fitting 13 is not disposed at the proper insertion position means a state where the terminal fitting 13 is not prevented by the lance 21 from coming out rearward.

As shown in FIG. 9, in the connector 10 for which the conductivity has been confirmed, the partner terminal fitting 90 is electrically connected to the terminal fitting 13.

As described above, due to the extended portion 35, the terminal fitting 13 can suppress excessive bending of the elastic contact portion 33. Further, since the front end 33A of the elastic contact portion 33 is a free end, the extended portion 35 that suppresses bending deformation of the elastic contact portion 33 can be exposed on the front surface side of the tubular portion 30. For this reason, it is possible to confirm conductivity by bringing the extended portion 35 into contact with the probe pin 92, instead of the elastic contact portion 33, and as a result, plastic deformation of the elastic contact portion 33 due to an external force can be suppressed.

Further, the front end 35A of the extended portion 35 is disposed forward of the front end 33A of the elastic contact portion 33 in a natural state. For this reason, bringing the probe pin 92 into contact with the extended portion 35 without coming into contact with the elastic contact portion 33 is easier, and as a result, a situation where the plastic deformation of the elastic contact portion 33 of the terminal fitting 13 due to being pressed by the probe pin 92 can be more reliably suppressed.

Further, the front end 35A of the extended portion 35 is disposed rearward of the front end 30D of the tubular portion 30. If the extended portion 35 is plastically deformed due to coming into contact with a foreign object or the like, the function of suppressing excessive bending of the elastic contact portion 33 may be impaired. In this regard, according to this terminal fitting 13, since the tubular portion 30 can function as a protection wall and a situation where a foreign object comes into contact with the extended portion 35 can be suppressed, the above problem can be suppressed.

Further, the extended portion 35 extends obliquely forward from the tubular portion 30. In a configuration in which the extended portion 35 extends perpendicular to the tubular portion 30, the entire force applied by the probe pin 92 that comes into contact with the extended portion 35 from the front is received by the extended portion 35, and thus the extended portion 35 is likely to plastically deform. In this regard, according to this terminal fitting 13, the force applied by the probe pin 92 that comes into contact with the extended portion 35 from the front can be distributed to the tubular portion 30 as well and divided, and thus plastic deformation of the extended portion 35 can be suppressed. Accordingly, a situation where the function of suppressing excessive bending of the elastic contact portion 33 is impaired due to plastic deformation of the extended portion 35 can be suppressed.

Further, according to the connector 10, the extended portion 35 of the terminal fitting 13 can be exposed forward of the housing 11 using the molding hole 24 provided to form the lance 21. For this reason, compared to a configuration where a hole for exposing the extended portion 35 is separately provided, the structure of the housing 11 can be simplified.

Other Embodiments of the Present Disclosure

It should be appreciated that the embodiments disclosed herein are to be construed in all respects as illustrative and not limiting.

(1) In the above embodiment, the front end of the extended portion is disposed forward of the front end of the elastic contact portion in the natural state. However, a configuration is also possible where the front end of the extended portion is not disposed frontward of the front end of the elastic contact portion in the natural state. For example, the front end of the extended portion may be aligned in the front-rear direction with the front end of the elastic contact portion in the natural state, or disposed rearward of the front end of the elastic contact portion in the natural state.

(2) In the above embodiment, the front end of the extended portion is disposed rearward of the front end of the tubular portion. However, a configuration is also possible where the front end of the extended portion is not disposed rearward of the front end of the tubular portion. For example, the front end of the extended portion may be aligned in the front-rear direction with the front end of the tubular portion, or may be disposed forward of the front end of the tubular portion.

(3) In the above embodiment, the extended portion extends obliquely forward from the tubular portion. However, the extended portion may have another shape. For example, the extended portion may extend perpendicular to the tubular portion.

(4) In the above embodiment, the elastic contact portion is indirectly linked to the tubular portion via the leg portions and the linking portion. However, the elastic contact portion may be directly linked to the tubular portion.

(5) In the above embodiment, the extended portion extends from the front end of the lower plate portion. However, the extended portion may extend from a portion rearward of the front end of the lower plate portion.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A terminal fitting comprising:

a tubular portion that extends in a front-rear direction and has an open front surface;

an elastic contact portion that is disposed in the tubular portion, extends in a front-rear direction, and has a rear end directly or indirectly connected to the tubular portion and a front end that is a free end; and an extended portion that extends from the tubular portion and opposes the elastic contact portion in a direction in which the elastic contact portion bends, wherein the extended portion is disposed at a position exposed on a front surface side of the tubular portion, and the elastic contact portion is apart from the extended portion to define a gap between the elastic contact portion and the extended portion when viewed from the front in a natural state.

2. The terminal fitting according to claim 1, wherein a front end of the extended portion is disposed forward of the front end of the elastic contact portion in the natural state.

3. The terminal fitting according to claim 1, wherein the front end of the extended portion is disposed rearward of a front end of the tubular portion.

4. The terminal fitting according to claim 1, wherein the extended portion extends obliquely forward from a portion of the tubular portion in a circumferential direction.

5. The terminal fitting according to claim 1, further comprising:

leg portions extending from a front end portion of the tubular portion and folded back inward of the tubular portion; and a linking portion linking rear end portions of the leg portions, wherein the elastic contact portion protrudes forward from the linking portion.

6. A connector comprising:

the terminal fitting according to claim 1; and a housing, wherein the housing includes:

a cavity in which the terminal fitting is disposed;

a lance capable of bending and deforming, and that is disposed in the cavity and locks the terminal fitting;

a front wall portion disposed forward of the cavity; and a molding hole that is open in the front surface of the front wall portion forward of the lance, and the extended portion of the terminal fitting is disposed at a position that is visible from the front side of the housing via the molding hole.

7. A connector comprising:

a terminal fitting; and a housing, wherein the terminal fitting comprises:

a tubular portion that extends in a front-rear direction and has an open front surface;

an elastic contact portion that is disposed in the tubular portion, extends in a front-rear direction, and has a rear end directly or indirectly connected to the tubular portion and a front end that is a free end; and an extended portion that extends from the tubular portion and opposes the elastic contact portion in a direction in which the elastic contact portion bends, the housing includes:

a cavity in which the terminal fitting is disposed;

a lance capable of bending and deforming, and that is disposed in the cavity and locks the terminal fitting;

a front wall portion disposed forward of the cavity; and a molding hole that is open in a front surface of the front wall portion forward of the lance, the extended portion is disposed at a position exposed on a front surface side of the tubular portion, and the extended portion of the terminal fitting is disposed at a position that is visible from the front side of the housing via the molding hole.

* * * * *